(No Model.)

J. A. ROUSE.
THRASHING MACHINE.

No. 377,214. Patented Jan. 31, 1888.

Witnesses,
N. A. Gilbert,
C. H. Andrus.

Inventor,
Jasper A. Rouse.

UNITED STATES PATENT OFFICE.

JASPER A. ROUSE, OF EAST BERKSHIRE, VERMONT.

THRASHING-MACHINE.

SPECIFICATION forming part of Letters Patent No. 377,214, dated January 31, 1888.

Application filed September 22, 1886. Serial No. 214,289. (No model.)

*To all whom it may concern:*

Be it known that I, JASPER A. ROUSE, of East Berkshire, in the county of Franklin, State of Vermont, have invented a certain new and useful Improvement in Thrashing-Machines, of which the following is a description, reference being had to the accompanying drawings, forming a part of this specification.

My invention relates to improved means for supporting the teeth in the cylinders, which will keep them tight under the severe strains to which they are exposed, and at the same time permit their ready insertion, withdrawal, or replacement in case of accident or injury, to accomplish which my invention involves a novel and useful construction, which will be hereinafter fully set forth.

Figure 1:
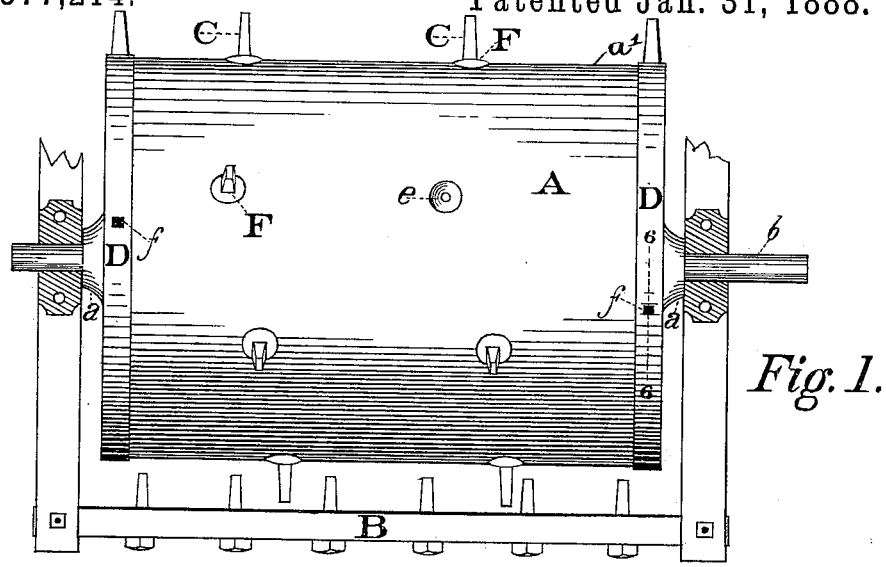
Figures 2, 3, 4, 5:
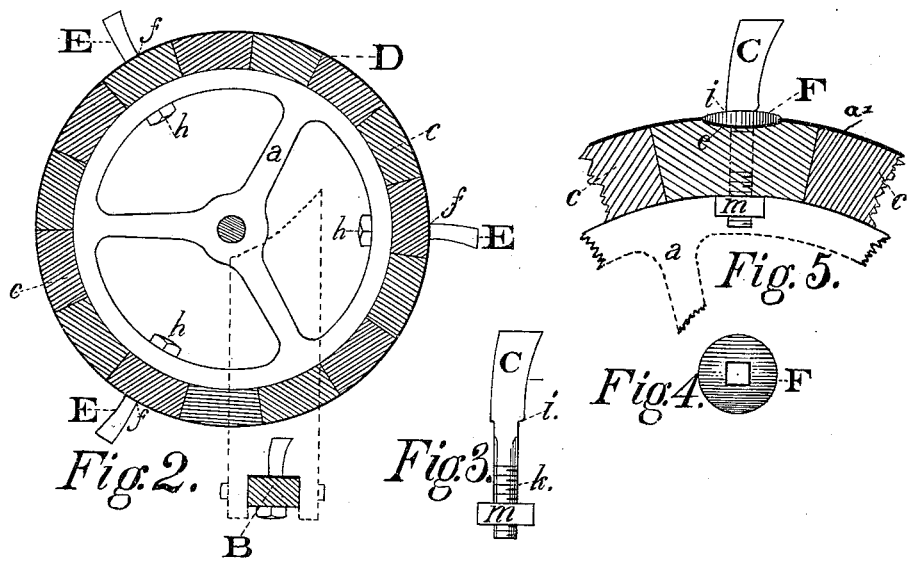

Figure 1 is a plan view of a toothed cylinder and concave embodying my improvements. Fig. 2 is a transverse section thereof. Fig. 3 is a detail view of one of the teeth. Fig. 4 is a detail view of one of the supporters. Fig. 5 is a sectional view of a portion of the cylinder, showing the manner in which the teeth are attached thereto.

Similar letters denote like parts throughout.

A represents the cylinder, which is formed of two iron heads, *a a*, mounted on a shaft, *b*, said heads being united by hard-wood staves, *c*, of a thickness sufficient to afford an ample bearing for the teeth and their supports.

B is the fixed bar or concave for holding the stationary teeth.

C are the teeth, which are formed with round screw-threaded shanks *k*, which shanks terminate and the tooth proper begins at the shoulders *i*.

F are circular double convex washers, formed with considerable thickness at their central portions and diminishing in thickness toward their edges, and they are formed with central apertures to receive the shanks of the teeth C, the shoulders *i* thereof resting upon the said washers, which form extremely strong and durable supports therefor.

*m* are nuts fitting the screw-threaded shank *k*.

As described, the cylinder A is constructed of wooden staves mounted upon metallic heads or spiders *a*, forming an open-ended cylinder. The staves *c* are formed with a countersunk depression, *e*, at each point where it is desired to place a tooth, and a round hole is bored through the stave to secure the shank *k*. The exterior of the cylinder is then covered with sheet metal *a'*, of a quality that will spin into or adjust itself to the depressions formed in the exterior of the wooden cylinder to secure the tooth-supporting washers F, as shown in Fig. 5. Over the exterior metallic covering are placed end bands, D, for firmly holding it in position. One or more teeth are also passed through the bands D, and in this instance the bands themselves form a sufficient support, and the washers F are omitted, the teeth passing through apertures *f*, the shoulders *i* being seated on the bands D and the teeth being secured in position by nuts *h* on the shanks K, projecting into the interior of the cylinder.

In attaching the teeth to the cylinder the teeth with their washers are placed in position and the nuts *m* placed on the ends of the shanks projecting into the interior of the cylinder. The nuts *m* are then rotated by hand until they rest against the inner wall of the cylinder, in which position they should be held either by hand or by the additional aid of a wrench. On applying a wrench to the tooth upon the exterior of the cylinder and imparting a few turns thereto the washer F will be found to have seated itself in the countersink *e* and to have depressed the metal covering thereinto, as indicated in Fig. 5, and to be firmly and permanently set. In most instances the nut *m* on the interior of the cylinder can be held by hand until by a few turns of the tooth it is drawn so tightly against said cylinder that the frictional contact between the teeth and cylinder will prevent it from turning during the remainder of the operation of setting the tooth. One great advantage of this mode of attachment is that in case a tooth works loose a turn or so with the wrench will tighten it, and in case one is entirely displaced or it is desired to replace one it can be removed from the exterior—that is, without being obliged to apply a wrench to the nut *m* in the interior of the cylinder, which, having been done, is readily placed in its position and the nut *m* put in position by being simply attached to the end of the shank projecting inside the cylinder, which is easily done by hand, and then, instead of driving said nut into its final position by using the wrench on the interior of the cylinder the wrench can be applied to the tooth and the tooth and its supporting-washer rotated until a perfect seat is formed therefor and the nut is screwed up tight, thus providing a very simple and convenient, and yet extremely strong, tooth, that can be inserted and removed with the least possible trouble, and, further, one that can be readily attached and detached while the cylinder is in its operative position and without removing it from the machine.

It will be apparent that the novel method above referred to could not be practiced with teeth having the usual form of concave shoulder, since, being formed to fit the convexity of the cylinder, they could not, when fitted thereto, be screwed up tight, by reason of its surface being a straight line longitudinally.

It will be obvious that the shank $k$ of the tooth may be round all the way up to the shoulder $i$, so that in tightening up the supporter need not be rotated.

Having described my invention, what I claim, and desire to secure by Letters Patent, is—

1. In a thrashing machine cylinder, the combination of wooden staves $c$, formed with countersunk depressions $e$, the teeth C, provided with shoulders, double convex washers F, fitting into the depressions $e$, and nuts $m$, substantially as shown and described.

2. In a cylinder for thrashing-machines, the combination of the heads and wooden staves, said staves being formed with countersunk depressions $e$ and bored to receive the shanks of the teeth, a metallic covering, $a'$, enveloping the cylinder, teeth C, formed with screw-threaded shanks and having shoulders $i$, and the double convex tooth-supporting washers F, arranged to fit into the depressions $e$ and to depress the metallic covering thereinto, substantially as described.

In testimony that I claim the foregoing I have hereunto set my hand this 1st day of September, 1886.

JASPER A. ROUSE.

Witnesses:
C. B. MOSIER,
H. A. POND.